Oct. 15, 1940.                C. SMITH                2,217,971
       AUTOMATIC SPEED SYNCHRONIZING UNIT FOR TWIN MOTORS
           Filed March 20, 1939          3 Sheets-Sheet 1
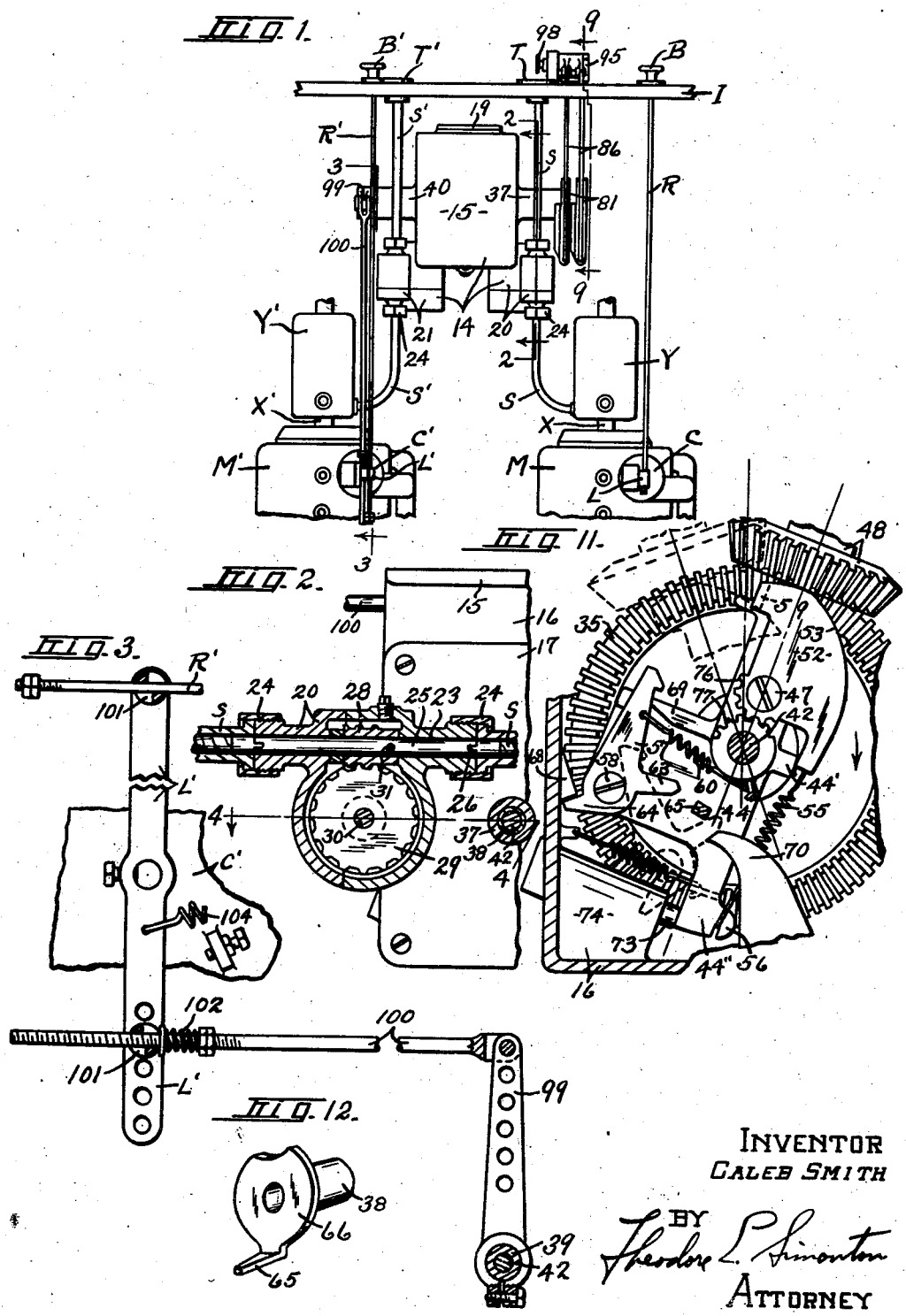
INVENTOR
CALEB SMITH
BY Theodore L. Simonton
ATTORNEY Oct. 15, 1940.  C. SMITH  2,217,971
AUTOMATIC SPEED SYNCHRONIZING UNIT FOR TWIN MOTORS
Filed March 20, 1939  3 Sheets-Sheet 2
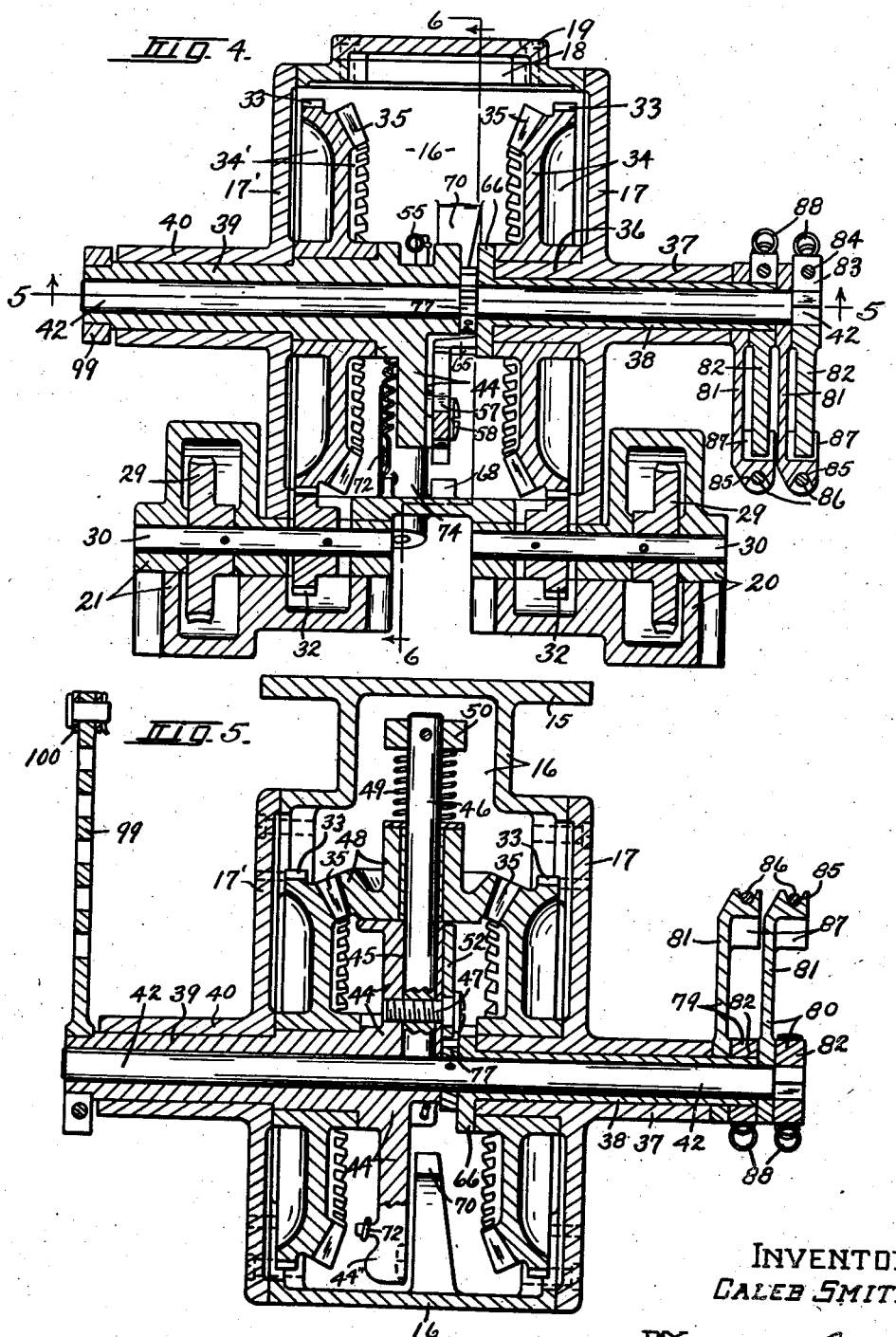
INVENTOR
CALEB SMITH
ATTORNEY Oct. 15, 1940.  C. SMITH  2,217,971
AUTOMATIC SPEED SYNCHRONIZING UNIT FOR TWIN MOTORS
Filed March 20, 1939  3 Sheets-Sheet 3
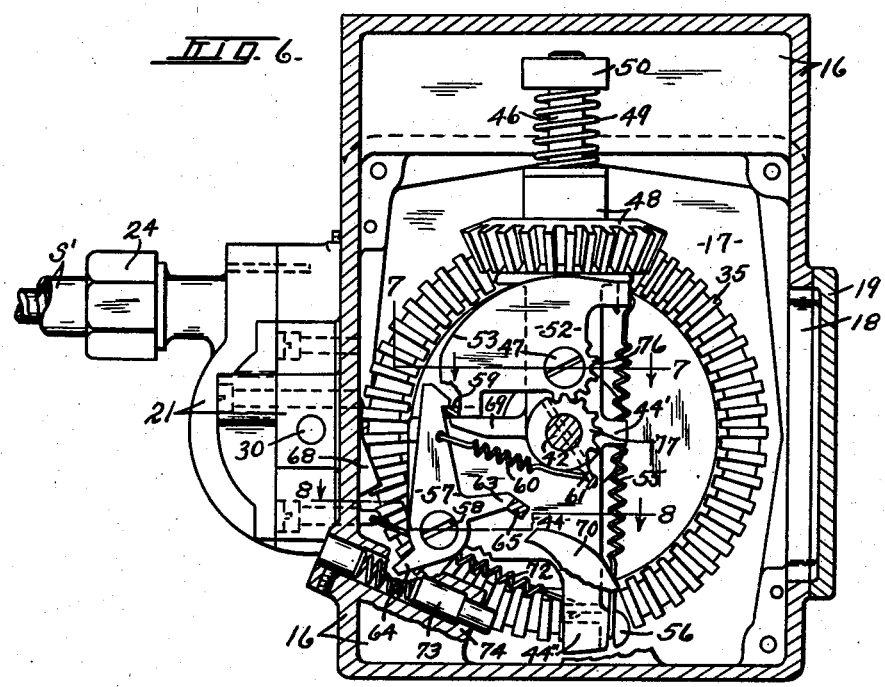
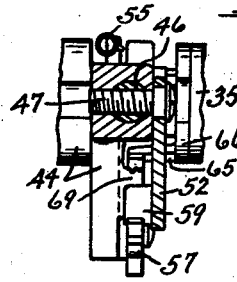
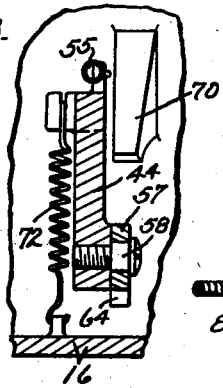
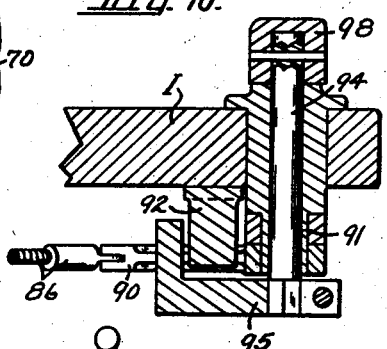
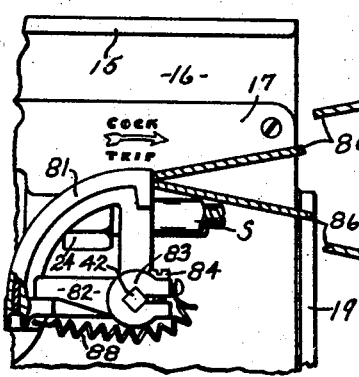
INVENTOR
CALEB SMITH
BY
Theodore E. Simonton
ATTORNEY Patented Oct. 15, 1940

2,217,971

UNITED STATES PATENT OFFICE 2,217,971

AUTOMATIC SPEED SYNCHRONIZING UNIT FOR TWIN MOTORS

Caleb Smith, Seneca Falls, N. Y.

Application March 20, 1939, Serial No. 262,916

12 Claims. (Cl. 60—97)

This invention relates to a speed synchronizing unit for automatically maintaining the speeds of operation of two marine or aircraft motors substantially equal.

The main object of the invention is to provide an improved apparatus for automatically synchronizing the operation of two internal combustion motors.

Another object of the invention is to provide an apparatus of the above mentioned class with control means whereby the apparatus may be manually rendered ineffective so that the speed of operation of both motors may be manually controlled independently of each other.

A further object of the invention resides in providing a speed synchronizing unit with means for automatically rendering said unit inoperative for controlling the motor governed thereby in case said governed motor operates faster than the governing or leading motor or when an excessive movement of the control element is produced due to one of the motors ceasing to operate when the other motor continues to operate or from any other cause.

A still further object is to produce a synchronizing unit which is economical and durable in construction, easy and dependable in operation and which may be readily connected in operative relation with a marine or aircraft motor drive of conventional construction.

Other objects and advantages pertaining to the construction of my novel synchronizing unit and to the form and relation of the parts thereof will more fully appear from the following description taken in conjunction with the accompanying drawings, in which:

Figure 1 is a partially diagrammatic or a schematic plan view of a preferred embodiment of the invention showing its application to a pair of motors adapted for operating a boat.

Figure 2 is a detail vertical sectional view taken substantially on line 2—2, Figure 1, illustrating the manner of connecting one side of the synchronizing unit to the tachometer cable associated with one of the motors.

Figure 3 is a detail vertical sectional view taken substantially on line 3—3, Figure 1, illustrating the manner of operatively connecting the carburetor or throttle valve of the following or governed motor with the synchronizing unit and with a manually operated control rod.

Figure 4 is a horizontal sectional view through the synchronizing unit taken substantially on line 4—4, Figure 2.

Figure 5 is a transverse vertical sectional view taken substantially on line 5—5, Figure 4.

Figure 6 is a vertical sectional view taken on line 6—6, Figure 4, illustrating the synchronizing unit in an intermediate operative position.

Figures 7 and 8 are detail transverse sectional views taken, respectively, on lines 7—7 and 8—8, Figure 6.

Figure 9 is a detail vertical sectional view taken substantially on line 9—9, Figure 1, illustrating the manually operated means for rendering the synchronizing unit operative or inoperative.

Figure 10 is a detail sectional view taken on line 10—10, Figure 9.

Figure 11 is a detail vertical sectional view similar to Figure 6, illustrating the synchronizing unit in the normal inoperative position.

Figure 12 is a perspective view of the inner end portion of the tubular trip shaft for rendering the synchronizing unit inoperative.

My novel synchronizing unit is shown in Figure 1 of the drawings as being operatively connected with two motors, both of which have their carburetor or throttle valve manually controlled by the operator, and one of the motors has its carburetor or throttle valve also normally connected with the automatic synchronizer to be controlled thereby. The synchronizer is operatively connected with both of the motors so that variation in the speeds of the two motors will actuate the control unit to maintain the speed of operation of the motor connected therewith substantially equal to the speed of the other motor which is manually controlled. The manually controlled motor will, therefore, hereinafter be referred to as the leading motor and the motor controlled by the synchronizer will hereinafter be referred to as the following motor for the purpose of clarity.

The synchronizing unit, as shown in Figure 1, is mounted between the instrument board I and the motors M and M' of the vehicle. The motors M and M' have the carburetors, as C and C', thereof operatively connected with control buttons B and B' mounted on the instrument board I by control rods R and R' connected at one end with the buttons B and B', respectively, and at the other end to the throttle valve levers L and L', respectively, of the carburetors C and C'. The instrument board shown in Figure 1 is also illustrated as being provided with a pair of tachometers T and T' which are connected with the motors M and M', respectively, by flexible shafts or tachometer cables S and S'.

The automatic synchronizing unit illustrated in the drawings comprises a case 14 which is provided with a mounting flange 15 connected with the body 16 of the case. The body 16 is more or less cylindrical in form and has opposite open sides which are closed by end plates 17 and 17', as shown in Figures 4 and 5. The body portion 16 of the case may, as shown in Figure 4, be provided with a hand hole 18 at one side thereof which is enclosed by a cover plate 19. Connected with the body portion at the opposite side thereof from the hand hole 19 is a pair of gear boxes 20 and 21, as shown in Figures 1 and 4.

Each of the gear boxes 20 and 21 is provided with a horizontally disposed opening 23 for receiving the corresponding flexible shaft or tachometer cable S or S'. Each of these tachometer cables, as illustrated more particularly in Figure 2, is composed of two sections, one section being connected with the tachometer T or T' mounted on the instrument board and the other section connected with the motor shaft X or X' by any suitable gear means provided in transmission cases Y or Y' for the motors M and M', respectively. The adjacent ends of the sections of each cable S or S' are connected with the corresponding gear box by union nuts 24 at corresponding ends of the opening 23, as illustrated in Figure 2.

Journaled in each opening 23 is a short shaft 25 which has the opposite ends thereof connected by a tongue and groove connection 26 with the adjacent end of the shaft or cable sections so that rotation of the shaft or cable section connected with the motor will transmit motion to the shaft 25 connected therewith and said shaft will in turn transmit the rotary motion to the shaft or cable section connected with the tachometer T or T'. Mounted on each shaft 25 intermediate the ends thereof is a worm 28 which is in meshing engagement with a worm gear 29 mounted on a shaft 30 which extends transversely through the corresponding gear box 20 or 21 beneath the shaft 25 and in substantially right angular relation thereto.

The worm 28 may, as shown in Figure 2, be secured to the shaft 25 by a shear pin 31, so that if undue stress is produced within the synchronizing unit the drive connection between the shaft 25 and worm 28 may be broken to eliminate possible damage to the mechanism of the synchronizing unit, without interrupting the drive connection between the motor and the tachometer actuated thereby.

Each shaft 30 has secured thereto a pinion 32 which is in meshing engagement with a spur gear 33 forming a portion of a composite differential side gear 34 or 34' mounted in the body portion 16 of the gear case 14, as illustrated in Figure 4. The differential side gears 34 and 34' are arranged in spaced substantially coaxial relation with each other within the case body 16 and each is provided with a bevel gear member 35 at the inner side thereof. One of the differential side gears 34 is rotatably mounted upon an inwardly extending cylindrical hub 36 provided on the adjacent end plate 17. The end plate 17 is also provided with an outwardly extending hollow hub 37 which, together with the hub portion 36, rotatably receives therein a tubular shaft 38. The other differential side gear 34' is rotatably mounted upon a tubular shaft 39 which, in turn, is journaled in an outwardly extending hollow hub portion 40 provided on the end plate 17', as shown in Figures 4 and 5.

The tubular shafts 38 and 39 are arranged in substantially coaxial relation with each other and rotatably receive therein a shaft 42 which extends from the outer end of the tubular shaft 39 to a short distance beyond the outer end of the tubular shaft 38. The tubular shaft 39 extends inwardly a short distance beyond the differential side gear 34' mounted thereon and has connected therewith a supporting flange or head 44 which extends outwardly substantially normal to the axis of rotation of said shaft.

The supporting head 44 is provided at one side thereof with a radially extending opening 45 which receives one end of a spindle 46. The spindle 46 is secured to the head 44 by a shouldered screw 47, as illustrated in Figure 5. The spindle 46 extends outwardly beyond the head 44 and has rotatably and slidably mounted thereon a differential pinion 48 which is normally maintained in meshing engagement with the bevel side gears 35 by a spring 49 mounted on the outer end of the spindle 46 between the pinion 48 and a collar 50 secured to the outer end of the spindle 46.

The screw 47 is connected with the head 44 a short distance outwardly from the shaft 42 in substantially parallel relation with said shaft and is utilized to rotatably connect a throw-out or trip cam 52 to the head 44. The cam 52 has its peripheral cam surface 53 arranged in eccentric relation to the screw 47 and adapted when in the normal cocked position to be slightly spaced from the inner adjacent portion of the differential pinion 48. When the cam is in the released or operative position, the cam surface 53 engages the pinion 48 and moves it outwardly against the action of the spring 49. The cam 52 is constantly urged toward the operative position into engagement with a stop lug 44' provided on the head 44 by a spring 55 connected with the cam and with a laterally disposed lug 56 provided on a radially disposed arm 44" arranged at the opposite side of the shaft 42 from the screw 47, as indicated in Figure 6.

The cam 52 is normally held in the cocked position against the action of the spring 55 by a latch 57 which is rotatably connected with the head 44 by a shouldered screw 58. The cam is normally maintained in engagement with a keeper 59 provided on the cam 52 by a spring 60 connected with the latch and with a lug 61 provided on the head 44 adjacent the shaft 42, as shown in Figure 6. The latch 57 may be moved out of engagement with the keeper 59 for releasing the cam 52 either manually or automatically and for this purpose is provided with a pair of trip arms 63 and 64.

The trip arm 63 extends inwardly from the latch 57 adjacent the screw 58 and has the inner end thereof arranged in the path of movement of a laterally disposed lug 65 provided on a circular flange 66 connected to the inner end of the tubular shaft or sleeve 38, as indicated in Figures 4, 6 and 12. The trip arm 64 is arranged at the opposite side of the pivotal screw 58 from the trip arm 63 and is adapted to move into contact with a fixed trip lug 68 provided on the case body 16, as shown in Figures 6 and 11, for moving the latch 57 against the action of the spring 60 and releasing the cam 52 when the supporting head 44 is moved an excessive amount in a clockwise direction, as viewed in Figures 6 and 11. The inward movement of the latch 57 produced by the spring 60 when the cam 52 is in the operative position is limited by a stop flange 69 provided on the head 44, as indicated in Figure 11.

A second fixed trip lug 70 is connected with the case body 16, as shown in Figures 6 and 11, at the opposite side of the pivotal screw 58 from the trip lug 68. The lug 70 extends inwardly from the adjacent side of the case body 16 and has the inner end thereof positioned beneath the path of swinging movement of the lug 65 and adapted to engage the trip arm 63 when the head 44 is rotated an excessive amount in an anti-clockwise direction, as viewed in Figures 6 and 11, for moving the latch 57 out of holding engagement with the cam 52.

The supporting head 44 is yieldingly urged in a clockwise direction, as viewed in Figures 6 and 11, by a spring 72 which has one end thereof connected with the arm 44″ adjacent the lug 56 and the other end connected with the case body 16 a short distance beneath the trip lug 68. The swinging movement of the head 44 produced by the spring 72 is yieldingly limited by a spring actuated stop pin or plunger 73 which is mounted in an inwardly disposed hollow boss 74 provided on the interior of the case body 16 at one side of the path of swinging movement of the latch 57. The stop pin or plunger 73 is arranged in the path of movement of the arm 44″ for engagement with said arm during the swinging movement of the head in a clockwise direction just prior to the engagement of the latch stop arm 64 with the stop lug 68.

The cam 52 is provided with a segmental gear section 76 arranged concentrically with the pivotal screw 47 and which has meshing engagement with a corresponding segmental gear 77 connected with the shaft 42 adjacent the inner end of the tubular shaft 38, as illustrated in Figures 4, 5 and 6.

It will now be observed that rotation of the tubular shaft 38 in a clockwise direction, as viewed in Figures 6 and 11, will effect actuation of the latch 57 to release the cam 52 whereby the cam may be moved by the action of the spring 55 from the cocked inoperative position out of engagement with the differential pinion 58 to the operative position for moving and maintaining the pinion 48 out of engagement with the side gear members 35. Furthermore, the cam 52 may be manually returned to the cocked position against the action of the spring 55 by rotation of the shaft 42 in a clockwise direction, as viewed in Figures 6 and 11, due to the engagement of the gear member 77 mounted on said shaft with the gear member 76 provided on the cam.

In order that the shafts 38 and 42 may be readily operated, the outer ends thereof have connected thereto operating members 79 and 80, respectively. Each of these operating members is composed of two arms 81 and 82. The arms 82 are substantially straight members clamped to the respective shaft as by split collars or hubs 83 associated with said arms to extend radially from the shaft, and by screws 84.

Each arm 81 is a segmental member having a groove 85 provided in the periphery thereof for receiving one end of an actuating cable 86. The arms 81 are rotatably mounted upon their respective shaft adjacent the inner side of the corresponding arm 82. Each arm 81 is provided with a pair of laterally disposed lugs 87 between which the outer end of the arm 82 associated therewith moves and with which the arm 82 may have engagement. A spring 88 connected with the arm 82 at one side of the shaft and with the corresponding arm 81 at the other side of the shaft upon which said arms are mounted, yieldingly urges relative rotary movement of the arms.

The cables 86 are connected with a pair of operating levers 90 which are rotatably mounted upon a bearing bushing 91 which may, as indicated in Figures 1 and 10, be clamped to the instrument board I of the boat or other vehicle in which the synchronizing unit is mounted. The levers 90 extend outwardly from the bushing 91 in diverging planes and have mounted between them a stop block 92 which is fixedly secured to the instrument board I by screws 93. The stop block 92 is so arranged that it maintains the levers 90 against swinging movement toward each other when said levers are in their normal innermost positions. A shaft 94 journaled in the bushing 91 to extend therethrough has secured to one end thereof a rock arm 95 arranged adjacent the levers 90. The outer end of the rock arm 95 is provided with a lug 96 which extends laterally from the arm between the levers 90 adjacent the outer side of the stop block 92.

It will now be observed that inasmuch as the springs 88 normally urge the arm members 81 connected therewith in a direction to move the levers 90 toward each other, said levers will be yieldingly maintained in engagement with the stop block 92 and each of said levers may be rocked in a direction away from the stop block by a corresponding swinging movement of the arm 95 due to the engagement of the lug 96 therewith. This rocking movement of the arm 95 is produced by a lever 98 secured to the shaft 94 at the end thereof opposite the arm 95.

As shown in Figure 3, an arm 99 clamped to the outer end of the shaft 39 is connected by a rod or link 100 to the hereinbefore mentioned carburetor control lever L'. The connection of the rod 100 and also of the hereinbefore mentioned manually actuated rod R' with the lever L' may be in any suitable manner and, as illustrated in Figure 3 of the drawings, these rods are slidably received in a suitable hole provided in a stud or post 101 rotatably connected with the lever L'. The rod 100 may, as shown, have a relatively stiff buffer spring 102 mounted thereon at the side of the post 101 opposite the lever 99 so that when the lever 99 pushes on the rod 100 to actuate the carburetor lever L', the latter lever will be yieldingly actuated.

The operation of the synchronizing unit will now be understood to be substantially as follows:

When the motors M and M' are in operation the differential side gears 34 and 34' are continuously rotated thereby by the gears 28, 29, 32 and 33 at a speed in any ratio to the engine speed desired, the speed of rotation of the side gears being at the same ratio and preferably very much less than that of the motors. The differential side gears 34 and 34' are rotated in opposite directions to one another so that when the motors M and M' and, therefore, gears 35 are operated at the same rate of speed, the differential pinion gear 48 meshing with the gears 35 will rotate about a stationary axis. It therefore follows that the spindle 46, shaft 39 and arm 99 will remain stationary with respect to the case 14.

If, however, the speed of the leading motor M is greater than that of the following motor M', the pinion 48 will have a planetary movement in the direction of rotation of the side gear 34 driven by the leading motor. This revolves the spindle 46 in the corresponding direction which rotates the shaft 39 and arm 99 in a direction to open the throttle valve of the following motor carburetor C' and increase the speed of the latter motor. As the following motor increases in speed, the gear member 34' will likewise increase in speed of rotation until it equals that of the gear member 34, whereupon the shaft 39 and spindle 46 will remain stationary.

Should the speed of the gear member 34' become greater than that of the gear member 34 from any cause, the pinion 48 will then move in the direction of rotation of the gear 34', thus causing the spindle 46, shaft 39 and arm 99 to move in a direction to permit the throttle valve of the following motor M' to be moved toward the closed position in the conventional manner, as by the action of a spring 104, connected with the lever L'. This will reduce the speed of rotation of the gear member 34' until it equals that of the gear member 34. It therefore follows that should the speed of the following motor become either less or greater than that of the leading motor, the pinion 48 will be actuated to move the spindle 46 and shaft 39 in one direction or the other to cause an increase or decrease in the amount of opening of the throttle valve of the following motor until the speed of operation of the following motor is uniform with that of the leading motor.

If, on the other hand, the speed of the manually controlled leading motor becomes either greater or less than that of the following motor, the throttle valve of the following motor will be likewise opened or closed to a greater degree and effect greater or less speed of operation of the following motor until the speed thereof is uniform with the speed of the leading motor. It will thus be seen that when the synchronizing unit is in operation, the operator controls the rate of speed at which the leading motor is to operate by manually controlling the throttle valve of the carburetor associated with said motor, and the synchronizing unit automatically controls the opening or closing of the throttle valve of the carburetor associated with the following motor to maintain the speed of operation of the following motor equal with that of the leading motor.

If an excessive amount of swinging movement of the pinion 48 and spindle 46 is produced as by one of the motors stopping while the other motor continues to operate, the pinion 48 will be automatically moved out of meshing engagement with the gear members 35. This breaks the driving connection between the differential side gears 34 and 34' and the throttle valve lever of the following motor M' and thereby prevents undue stress or damage which might otherwise be caused to the throttle valve or the connection between said throttle valve and the synchronizing unit shaft 39.

This automatic movement of the pinion gear 48 out of meshing engagement with the gear members 35 is produced by the engagement of one or the other of the latch arms 63 or 64 with the fixed trip lugs 70 or 68 depending upon the direction of rotation of the supporting head 44 produced by the gear 48. If the supporting head 44 is rotated in a clockwise direction to an excessive degree, the arm 64 of the latch will engage the trip lug 68 and cause the latch to move out of engagement with the keeper 59. As soon as the keeper 59 has thus been released, the cam 52 will be rotated by the action of the spring 55 about the pivotal screw 57 to bring the cam face 58 thereof into engagement with the pinion 48 and move said pinion outwardly longitudinally of the spindle 46 against the action of the spring 49.

The cam 52 is so constructed that when it has been moved by the spring 55 to its extreme operative position, the pinion 48 will be maintained out of engagement with the gear members 35. When the pinion 48 has moved out of engagement with the gears 35 the supporting head 44 will be maintained with the arm 44" thereof in engagement with the stop pin 73 by the action of the spring 72 on said head. In other words, the pinion 48, cam 52, head 44 and latch 57 will be substantially in the position illustrated by full lines in Figure 11.

If, on the other hand, the supporting head 44 is moved in the opposite direction, that is, in an anticlockwise direction, as viewed in Figures 6 and 11, then the arm 63 of the latch 57 will be brought into engagement with the trip lug 70 and cause the latch to be moved out of engagement with the keeper 59 and release the cam 52, at which time the pinion 48, cam 52 and latch 57 will be substantially in the position indicated by broken lines in Figure 11. As soon as the cam 52 is released, the spring 55 will actuate said cam to move the pinion 48 out of meshing engagement with the gears 35.

As the pinion 48 is moved out of meshing engagement with the gears 35, the spring 72 rocks the head 44 and the members carried thereby in a clockwise direction from the position indicated by broken lines in Figure 11 to the position indicated by full lines in said figure, with the arm 44" in engagement with the stop pin 73. When the pinion 48 is thus maintained out of engagement with the gears 35, the synchronizing unit is rendered inoperative for controlling the throttle valve of the following motor M' and both motors M and M' may be then manually controlled independently of each other to vary the speeds thereof as desired.

When it is again desired to place the synchronizing unit in operation, this may be easily accomplished by the operator rocking the lever 98 to swing the arm lug 96 into engagement with the lever 90 connected with the operating member 80 mounted on the shaft 42 and rock lever 90 about the axis of the bushing 91 away from the stop 92. This swinging movement of the lever 90 produces a corresponding swinging movement of the arm segment 81 which, in turn, produces a corresponding swinging movement of the arm member 82 and the shaft 42 to which said arm is connected. This rotation of the shaft 42 produces a corresponding rotation of the cam 52 due to the engagement of the gear 77 on said shaft with the gear 76 on the cam. The cam 52 will be rotated in an anti-clockwise direction from the position shown in full lines in Figure 11 into engagement with the latch 57.

During the swinging movement of the cam 52 the head 44 will be maintained with the arm 44" thereof in engagement with the plunger or stop pin 73 due to the action of the spring 72 upon the head. The plunger 73 and the spring therefor are so constructed that the head 44 will be maintained against rotation in a clockwise direction when the cam 52 is being moved into engagement with latch 57 so that the latch trip arm 64 will be held from engaging the trip lug 68 as the cam is being cocked. However, plunger 73 is adapted to permit rotation of the head 44 in a clockwise direction when said head is actuated by engagement of pinion 48 with gears 35 to bring trip arm 64 into engagement with lug 68 to trip latch 57. As soon as the keeper 59 of the cam has been engaged by the latch 57 so that the cam will thus be maintained in its inoperative position and lever 98 has been released by the operator, the segmental arm 81 will be returned to its normal lowermost position by the action of the spring 88 which also returns lever 90 to its innermost position in engagement with the stop 92.

As soon as the cam 52 is returned into its normal inoperative or cocked position in engagement with the latch 57, the pinion 48 will be returned by the spring 49 into engagement with the gears 35. As soon as the pinion engages the gears 35 the pinion will be operated in the usual manner for actuating the head 44, shaft 39 and lever 99 for controlling the throttle valve of the following motor providing the following motor is operating at the same or a slower rate of speed than the leading motor. If, for any reason, the following motor should be operating at a higher rate of speed than that of the leading motor when the pinion 48 engages the gears 35, then the head 44 will be revolved in a direction to bring the trip arm 64 of the latch 57 into engagement with the trip lug 68 and again release the cam 52, and thereby disengage the pinion 48 from the gears 35 and render the synchronizing unit inoperative.

When it is desired to manually render the synchronizing unit inoperative, this may be readily accomplished by the operator moving the lever 98 in a direction to cause the arm 95 to actuate the lever 90 connected with the arm member 81 associated with the shaft 38 and rotate said shaft. Rotation of the shaft 38 in a clockwise direction, as viewed in Figures 6 and 11, will cause the lug 65 to engage the trip arm 63 of the latch 57 and move said latch out of engagement with the keeper 59 and thereby release the cam 52. As soon as the cam 52 is thus released, the spring 55 will rotate the cam about the pivotal screw 47 in the manner hereinbefore described to bring the pinion 48 out of meshing engagement with the gears 35.

From the above description, it will be apparent that the operator may control but one motor when the synchronizing unit is in operation and said unit will automatically control the operation of the other motor to maintain the speeds of operation of the motors equal. If, however, the operator desires to control either of the motors independently of the other he may readily do this by rendering the synchronizing unit inoperative by the manipulation of the lever 98. Similarly, the operator may again throw the synchronizing unit into operation for automatically controlling the speed of operation of the following motor in accordance with the speed of operation of the leading motor by simply operating the lever 98.

Furthermore, the synchronizing unit will automatically render itself inoperative to control the following motor in case an excessive rotation of the head 44 is produced by the action of the gears 35 upon the pinion 48 in either direction by the engagement of a trip arm of the latch 57 with a trip lug 68 or 70.

Although I have shown and particularly described the preferred embodiment of my invention, I do not wish to be limited to the exact construction shown as various changes both in the form and relation of the parts thereof may readily be made without departing from the spirit of the invention as set forth in the appended claims.

I claim:

1. In a speed synchronizing unit for twin motors, a speed differential mechanism including two drive members, means operatively connecting the drive members to the motors respectively so that said members are operated thereby in predetermined relation to the speed of operation of said motors, a driven member movable from an inoperative position out of engagement with the drive members into an operative position in engagement with said drive members, said driven member being adapted when in said operative position to transmit motion from one of said drive members to the other and to be moved bodily by said drive members in the direction of movement of one of said members upon relative movement of said drive members with respect to each other, means operatively connecting the driven member with the control element of one of the motors for operating said control element in accordance with said bodily movement of said driven member, and means for moving the driven member from one of said positions to the other one of said positions thereof.

2. A speed synchronizing unit as defined in claim 1 wherein said last mentioned means comprises a throwout member engageable with the drive member and mounted to move with said drive member during said bodily movement thereof, and manually operated means for actuating the throw-out member.

3. A speed synchronizing unit as defined in claim 1 wherein said last mentioned means comprises a spring loaded throw-out member operatively connected with the driven member to move therewith during said bodily movement of said driven member, said throw-out member being movable from an operative position in engagement with the driven member to an inoperative position out of engagement with said driven member, holding means for releasably maintaining the throw-out member in the inoperative position, and manually operated means for actuating the holding means for releasing said throw-out member.

4. In a speed synchronizing unit for twin motors having manually operated speed control elements therefor, a speed differentiating mechanism including two drive members and a driven member adapted to be operated by the drive members upon relative movement of said drive members, means operatively connecting said drive members with the motors respectively for operating said members in predetermined relation to the speeds of operation of the motors, means operatively connecting the driven member with the control element of one of the motors so constructed and arranged that the control element will be operated by said driven member independently of the manual operation thereof, throw-out means including a spring loaded throw-out member engageable with the driven member for moving said driven member out of operative relation with the drive members to render the unit inoperative, manually operated means for actuating said throw-out means to cause movement of said throw-out member to and from an operative position, means for releasably maintaining said throw-out member in the inoperative position, and means engageable with said latter means upon an excessive movement of the driven member for automatically releasing the throw-out member.

5. A speed synchronizing unit for twin motors having manually operated speed control valves therefor, a pair of differential side gears, a differential pinion normally meshing with the side gears, a rotatable supporting member for the pinion mounted coaxially with the differential side gears, means operatively connecting the side gears with the motors respectively for driving said gears, means connecting the supporting member with the control valve of one of the motors, and means for moving the differential pinion out of meshing engagement with the side gears for rendering the synchronizing unit inoperative.

6. A speed synchronizing unit for twin motors having manually operated speed control valves therefor, a pair of differential side gears operatively connected with the motors respectively to be driven thereby, a differential pinion meshing with the side gears movable about the axis of rotation of the side gears upon relative rotary movement of said latter gears, means operatively connecting the pinion with the control valve of one of said motors, means for yieldingly maintaining the pinion in said meshing engagement with the side gears, and throw-out means engageable with said pinion with a cam action for moving the pinion out of meshing engagement with the gears to render the synchronizing unit inoperative.

7. A speed synchronizing unit for twin motors having manually operated speed control valves therefor, a pair of differential side gears operatively connected with the motors respectively to be driven thereby, a differential pinion meshing with the side gears movable about the axis of rotation of the side gears upon relative rotary movement of said latter gears, means operatively connecting the pinion with the control valve of one of said motors, means for yieldingly maintaining the pinion in said meshing engagement with the side gears, a cam movable into engagement with the pinion for moving said pinion out of meshing engagement with the side gears to render the unit inoperative, means releasably holding the cam member in an inoperative position out of engagement with the pinion, and spring means for moving the cam to the operative position in engagement with the pinion when said cam is released by the holding means.

8. A speed synchronizing unit as defined in claim 1 wherein said last mentioned means comprises a spring loaded throw-out member operatively connected with the driven member to move therewith during said bodily movement of said driven member, said throw-out member being movable from an operative position in engagement with the driven member to an inoperative position out of engagement with said driven member, holding means for releasably maintaining the throw-out member in the inoperative position, manually operated means for actuating the holding means for releasing said throw-out member, and separate manually operated means for moving the throw-out member from the operative position to said inoperative position in engagement with the holding means.

9. The combination with two internal combustion engines having crank shafts and throttle valves, of a speed synchronizing unit having a case, a speed differential gearing mounted in said case and including a pair of side gears and a pinion normally meshing with said side gears, a pair of shaft members journaled in the case to rotate independently of the side gears, means operatively connecting the side gears with the crank shafts respectively of the motors, means rotatably supporting the pinion including a supporting head connected with one of said shafts and a spindle for the pinion secured to said head, separate means operatively connecting said latter shaft with the throttle valve of one of the engines, and means connected with the second one of said shafts and with said head for moving the pinion out of meshing engagement with the side gears.

10. A structure as defined in claim 9 wherein said latter means includes a cam rotatably connected with the supporting head, a spring connected with the head and cam for urging said cam into operative engagement with the pinion, means including a latch and keeper connected with the head and with the cam for holding the cam in an inoperative position out of engagement with the pinion against the action of the spring, and means actuated by said second shaft for moving the latch and keeper out of holding engagement with each other.

11. A structure as defined in claim 9 wherein said latter means includes a cam rotatably connected with the supporting head, a spring connected with the head and cam for urging said cam into operative engagement with the pinion, means including a latch and keeper connected with the head and with the cam for holding the cam in an inoperative position out of engagement with the pinion against the action of the spring, and means connecting the cam with said second shaft for rotating said cam to bring the latch into engagement with the keeper.

12. A structure as defined in claim 9 wherein said latter means includes a cam rotatably connected with the supporting head, a spring connected with the head and cam for urging said cam into operative engagement with the pinion, means including a latch and keeper connected with the head and with the cam for holding the cam in an inoperative position out of engagement with the pinion against the action of the spring, means actuated by said second shaft for moving the latch out of holding engagement with the keeper, a third shaft journaled in said case, and means operatively connecting said third shaft with the cam for moving said cam against the action of the spring to bring the latch and keeper into engagement with each other.

CALEB SMITH.